US006784968B1

(12) United States Patent
Hughes et al.

(10) Patent No.: US 6,784,968 B1
(45) Date of Patent: Aug. 31, 2004

(54) ADDRESSING BISTABLE NEMATIC LIQUID CRYSTAL DEVICES

(75) Inventors: Jonathan R Hughes, Malvern (GB); John C Jones, Malvern (GB); Guy P Bryan-Brown, Malvern (GB); Alistair Graham, Malvern (GB)

(73) Assignee: ZBD Displays Limited, Malvern (GB)

( * ) Notice: Subject to any disclaimer, the term of this patent is extended or adjusted under 35 U.S.C. 154(b) by 0 days.

(21) Appl. No.: 09/914,854

(22) PCT Filed: Mar. 2, 2000

(86) PCT No.: PCT/GB00/00723

§ 371 (c)(1), (2), (4) Date: Sep. 13, 2001

(87) PCT Pub. No.: WO00/52671

PCT Pub. Date: Sep. 8, 2000

(30) Foreign Application Priority Data

Mar. 3, 1999 (GB) ............................................ 9904704

(51) Int. Cl.[7] ............................................ C09K 19/02
(52) U.S. Cl. ........................ 349/179; 349/184; 349/185
(58) Field of Search ................................ 349/179, 169, 349/185, 184; 345/87, 89, 97

(56) References Cited

U.S. PATENT DOCUMENTS 5,157,525 A * 10/1992 Eaton et al. .................. 345/87
5,748,166 A * 5/1998 Hughes et al. ................ 345/97
5,748,277 A * 5/1998 Huang et al. ............... 349/169
5,905,482 A * 5/1999 Hughes et al. ................ 345/89
2002/0057242 A1 * 5/2002 Yoneda et al. ................ 345/87

FOREIGN PATENT DOCUMENTS

| | | |
|---|---|---|
| EP | 0 569 029 | 11/1993 |
| WO | WO 94/18665 | 8/1994 |
| WO | WO 97/14990 | 4/1997 |

* cited by examiner

*Primary Examiner*—Huyen Ngo
(74) *Attorney, Agent, or Firm*—Nixon & Vanderhye P.C.

(57) ABSTRACT

A bistable nematic liquid crystal device is addressed by application of a row waveform to successive row electrodes of an x, y matrix of pixels whilst one of two data waveforms are applied to each column electrode. The row waveform has a period of two or more time slots (ts), with two dc pulses of opposite amplitude for causing a switching to a dark state, and two dc pulses of opposite amplitude for causing a switching to a light state. The data waveforms have the same period as the strobe with dc pulses of opposite amplitude and combine with the strobe pulses to switch the device. The device can be addressed in two field periods, one field switching to a dark state, the other field switching to a light state. Alternatively, the device can be blanked to the dark state then selectively switched to the light state. When blanking is used, the row waveform has blanking de pulses placed a short time before selective switching to reduce overall addressing time. Zero voltage pulses may be used within the two or more time slot period of the strobe and data waveforms; these reduce rms. voltages appearing at the pixels and enhance contrast ratio.

28 Claims, 14 Drawing Sheets

Fig. 3a
Fig. 3b
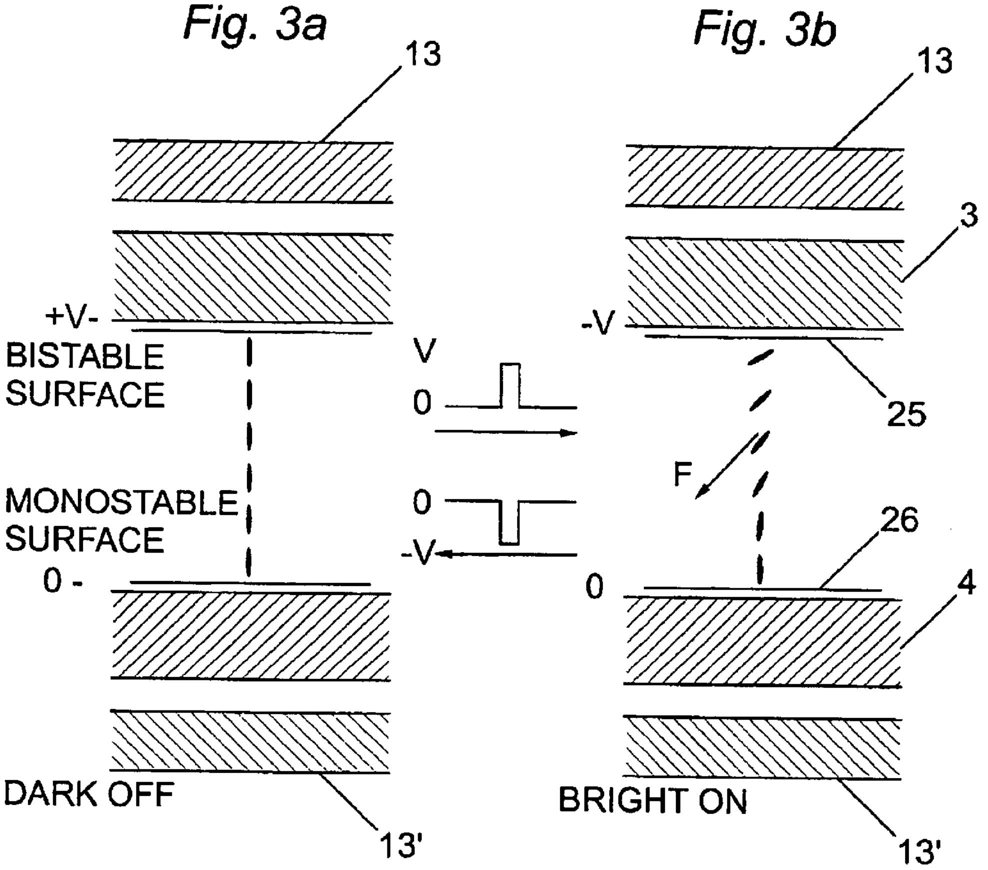
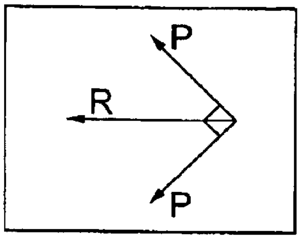

ADDRESSING BISTABLE NEMATIC LIQUID CRYSTAL DEVICES

This application is the US national phase of international application PCT/GB00/00723, filed in English on 2 Mar. 2000, which designated the US. PCT/GB00/00723 claims priority to GB Application No. 9904704.5 filed 3 Mar. 1999. The entire contents of these applications are incorporated herein by reference.

This invention relates to the addressing of bistable nematic liquid crystal devices.

One known bistable nematic liquid crystal device is described in WO-97/14990, PCT/GB96/02463, GB98/02806.1, EP96932739.4 and has been described a zenithal bistable device (ZBD™). This device comprises a thin layer of a nematic or long pitch cholesteric liquid crystal material contained between cell walls. Optically transparent row and column electrode structures arranged in an x,y matrix of addressable pixel allow an electric field to be applied across the layer at each pixel causing a switching of the material. One or both cell walls are surface treated to permit nematic liquid crystal molecules to adopt either of two pretilt angles in the same azimuthal plane at each surface. Opposite surfaces may have pretilt in differing azimuthal planes. The two states are observed as a dark (e.g. black) and a bright (e.g. light grey) state. The cell can be electrically switched between these two states to allow information display which can persist after the removal of power; i.e. the liquid crystal material is latched into either of the two allowed states and remain in the one latched state until electrically switched to the other latched state.

Another bistable nematic device is described in WO99/34251, PCT/GB98/03787. This uses grating structures to provide bistable alignment similar to WO-97/14990 but uses a negative dielectric anisotropy material.

The terms switching and latching need some explanation: in monostable nematic devices, the effect of a suitable applied electric field is to move the liquid crystal molecules (more correctly the director) from one alignment condition to another, i.e. from a zero applied voltage OFF state to an applied voltage ON state. In a bistable device, the application of a voltage may cause some movement of the liquid crystal molecules without sufficient movement to cause them to permanently move into a different (one of two) state. In the present application, the term switch and latch are used to mean the molecules are caused to move from one bistable state to the other bistable state; where they remain until switched or latched back to the first state.

The term same azimuthal plane is explained as follows; let the walls of a cell lie in the x,y plane, which means the normal to the cell walls is the z-axis. Two pretilt angles in the same azimuthal plane means two different molecular positions in the same x,z plane.

Another bistable nematic liquid crystal device is described in GB-2,286,467. This uses a grating alignment surface to give two stable states in two different azimuthal planes.

Most presently available liquid crystal devices are monostable and are addressed using rms. addressing methods. For example twisted nematic and phase change type of liquid crystal devices are switched to an ON state by application of a suitable voltage, and allowed to switch to an OFF state when the applied voltage falls below a lower voltage level. In these devices the liquid crystal material responds to the rms. value of the electric field. Various well-known addressing schemes are used; all use ac rms. voltage values. This is convenient because liquid crystal material deteriorat if the applied voltage is dc.

EP 569,029 describes a long pitch cholesteric liquid crystal display having two metastable switched states. The material is first switched to a Frederick's transition, then switched with other voltages to either of the two metastable states. Each state lasts for about 10 seconds after voltage is removed; i.e. the display has (temporary) bistability providing the display is continually addressed.

Another type of device is the ferroelectric liquid crystal display (FELCD) which can be made into bistable device with the use of smectic liquid crystal materials and suitable cell wall surface alignment treatment. Such a device is a surface stabilised ferroelectric liquid crystal device (SSFELCDs) as described by: -L J Yu, H Lee, C S Bak and M M Labes, Phys Rev Lett 36, 7, 388 (1976); R B Meyer, Mol Cryst Liq Cryst. 40, 33 (1977); N A Clark and S T Lagerwall, Appl Phys Lett, 36, 11, 899 (1980). Then device switch upon receipt of a suitable unipolar (dc) pulse of suitable voltage amplitude and time. For example a positive pulse switches to an ON state, and a negative pulse switches to an OFF state. A disadvantage of this in that the material will degenerate under dc. voltages. Therefore the many known addressing schemes must ensure a net zero value dc. For example by periodically inverting all voltages.

Known addressing schemes for bistable smectic devices include those described in EP-0,542,804 PCT/GB91/01263, EP-0,308,203, EP-0,197,742, Surgey et al ferroelectric 1991, vol. 122 pp63–79 etc. Some use mono pulse strobe pulses, others bipolar strobe pulses in combination with bipolar data pulses.

Bistable nematic devices, as mentioned above, switch between or latch into their two bistable states upon receipt of suitable unipolar (dc) pulses. This may allow use of existing addressing schemes previously used for ferro electric bistable devices. However, the switching characteristics of bistable nematic devices are different from that of ferro electric bistable devices.

The present invention addresses the problem of switching bistable nematic liquid crystal devices by providing new addressing schemes, which take account of the different switching characteristics of bistable nematic devices.

According to this invention a method of addressing a bistable nematic device formed by two cell walls enclosing a layer of nematic or long pitch cholesteric liquid crystal material with electrode structures carried by the walls to form a series of row electrodes on one wall and a series of column electrodes on the other wall to form a matrix of intersecting regions or pixels with a wall surface treatment on at least one wall providing a molecular alignment permitting the molecules at or adjacent the wall to align into two different stable states upon application of appropriate unipolar voltage pulses, the method comprising the steps of:

- applying a row waveform to each row in a sequence whilst simultaneously applying one of two data waveforms to each column electrode whereby each pixel can be independently switched between two bistable states;
- the row waveform having a period of at least two time slots, at least two unipolar pulses for switching the device to a first state, and at least two unipolar pulses for switching the device to a second state,
- both data waveforms having a period of at least two time slots with a unipolar pulse in each time slot, with at least one data waveform shaped to combine with the row waveform to cause a switching to one latched state
- whereby each pixel can be addressed to latch into either stable state to collectively provide a desired display, with a substantially net zero dc voltage applied to the device.

Preferably the alignment treatment on a cell wall is arranged to give two different switching characteristics; namely lower voltage/time values for switching from one latched state to the other latched state. This may be arranged by variation of the height of grooves in a grating structure, and/or variation of the period of the grating, and/or selection of a surfactant on the grating, and/or selection of material elastic constants. The surfactant may be lecithin or a chrome complex surfactant.

The addressing of the device may be in two field times, one for switching to one stable state, and the other for switching into the second stable state. The field times may be identical or different in length. The device may be addressed by selectively switching pixels to one state in one field time and selectively switching pixels to the other state in the second field time. Alternatively, some or all of the pixels may be blanked into one state, then selectively switched to the other state. The blanking can be done at the same time to all pixels, a row at a time (e.g. one or more rows ahead of selective addressing), or the blanking and selective addressing may be combined as each row is being addressed.

The row waveform may be at least two unipolar pulses capable of blanking pixels, and at least two unipolar addressing pulses capable of combining with data waveforms to selectively switch pixels. The blanking pules may be of equal and opposite (or the same polarity) amplitude or different (including a zero) amplitude; similarly the addressing pulses may be of equal and opposite amplitude or different (including a zero) amplitude providing that overall the device receives substantially net zero dc voltage. The blanking pulses may be of the same or different amplitude to those of the addressing pulses. The two blanking pulses and the two addressing pulses may be equally or unequally spaced apart in time including blanking immediately followed by addressing. When the row waveform period is formed of three or more ts periods, then at least one time slot may be of zero voltage amplitude.

Each data waveform is usually of equal and opposite alternate pulses. However, for some applications a zero voltage may be applied in one time slot of each waveform period.

The row and data waveforms may have periods of two, three, four, or more time slots ts. The line address time may have periods of two, three, four, or more time slots ts. Furthermore, the row waveform period may extend in time over more than one line address time, in a manner analogous to the addressing of FELCDs in EP-0,542,804 PCT/GB91/01263.

The addressing may be to each row in turn, or in a different sequence, such as interleaving the addressing e.g. as in FIG. 11 below.

The temperature of the liquid crystal material may be measured and voltages Vs, Vd ratio of Vs/Vd and/or time length of ts, and/or relative position of blanking to selective addressing pulses adjusted to compensate for switching characteristics with temperature.

Additional voltage waveforms, voltage reduction waveforms, may be added to the row and or column electrodes. When added to row electrodes these voltage reduction waveforms combine with the column voltages without changing the required switching voltages to give an overall reduction in peak or rms. levels.

Use of voltage reduction waveforms gives reduced voltages requirements for driver circuits. This enables standard drivers circuits designed to rms. address twisted nematic type of displays, to be used as in GB 2,290,160.

According to this invention a bistable nematic device comprises;

- two cell walls spaced apart and enclosing a layer of nematic or long pitch cholesteric liquid crystal material;
- a first series of electrodes on one wall and a second series of electrodes on the other wall collectively forming a matrix of intersecting regions or pixels;
- surface treatments on at least one wall to provide a molecular alignment permitting the molecules at or adjacent the wall to align into two different stable states upon application of appropriate unipolar voltage pulses;
- means for distinguishing between the switched states of the liquid crystal material;
- means for generating and applying a row waveform to each electrode in the first series of electrodes in a sequence;
- means for generating and applying one of two data waveforms to each electrode in the second series of electrodes;
- the row waveform having a period of at least two time slots and at least two unipolar pulses for switching the device to a first state, at least two unipolar pulses for switching the device to a second state;
- both data waveforms having a period of at least two time slots with a unipolar pulse in each time slot giving substantially net zero dc value, with at least one data waveform shaped to combine with the row waveform to cause a switching to one latched state;
- whereby each pixel can be independently switched into either stable state to collectively provide a desired display, with a substantially net zero dc voltage applied to the device.

The means for distinguishing between the switched states of the liquid crystal material may be two polarisers, or a dichroic dye in the liquid crystal material with or without one or more polarisers. The polarisers may be neutral or coloured.

The first series of electrodes may be formed into row or line electrodes, and the second series of electrodes formed into column electrodes. The row and column electrodes form collectively a x,y matrix of addressable pixels. Typically the electrodes are 200 μm wide spaced 20 μm apart. Other electrode configurations may be used. For example so called r-θ arrangements. Also alpha numeric, or seven or eight bar arrangements may be made.

The surface treatment may be grating surfaces. The grating may be a profiled layer of a photopolymer formed by a photolithographic process e.g. M C Hutley, Diffraction Gratings (Academic Press, London. 1982) p 95–125; and F Horn, Physics World, 33 (March 1993). Alternatively, the grating may be formed by embossing; M T Gale, J Kane and K Knop, J App. Photo Eng, 4, 2, 41 (1978), or ruling; E G Loewen and R S Wiley, Proc SPIE, 88 (1987), or by transfer from a carrier layer.

The grating profile may be uniform over each complete pixel, or may vary within each pixel so that different voltage levels are needed to switch different areas of a pixel. For such an arrangement, more than two different data waveforms may be used.

The device may include driver circuits, logic arrays, inputs such as keyboards, or computer links to address the device. Alternatively, the device may be a cell only, with cell walls, electrodes, liquid crystal material, and surface alignment treatment. In the latter case, the device may include contacts for connecting to drivers etc. as required when changes are made to the display device. This utilises the bistable nature of the device. For example smart cards may display information that can be changed by external means such as driver circuits, radio, magnetic, or laser readers or addressers when inserted into control circuits etc.

Cells designed as smart cards may suffer from static effects when moved around, e.g. into pockets or wallets. To avoid possible static effects some or all of the electrodes may be connected together with resistive links. These allow a charge stabilisation at the electrodes to prevent unwanted changes in display. The links are of sufficient is value to allow the induced charges to equalise slowly without effecting the much higher frequency voltage changes occurring when the cell is addressed.

The device may include nematic material only, or nematic plus a small amount of a chiral or cholesteric additive such as cholesteric liquid crystal material, and may include an amount of a dichroic dye for enhancing observed colour.

The invention will now be described, by way of example only with reference to the accompanying drawings of which:

Figure 4:
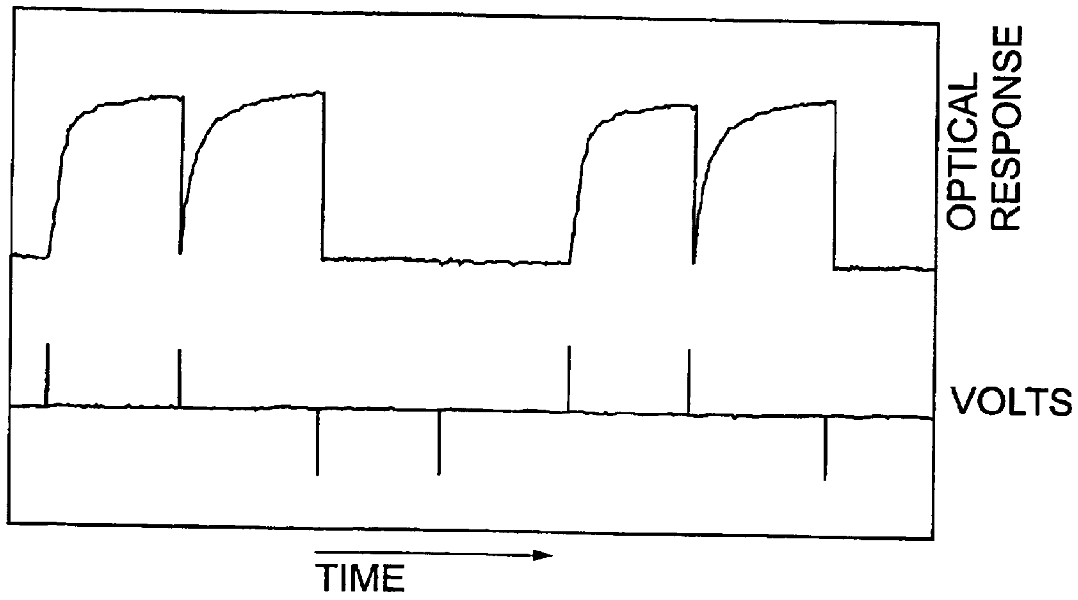
Figure 5:
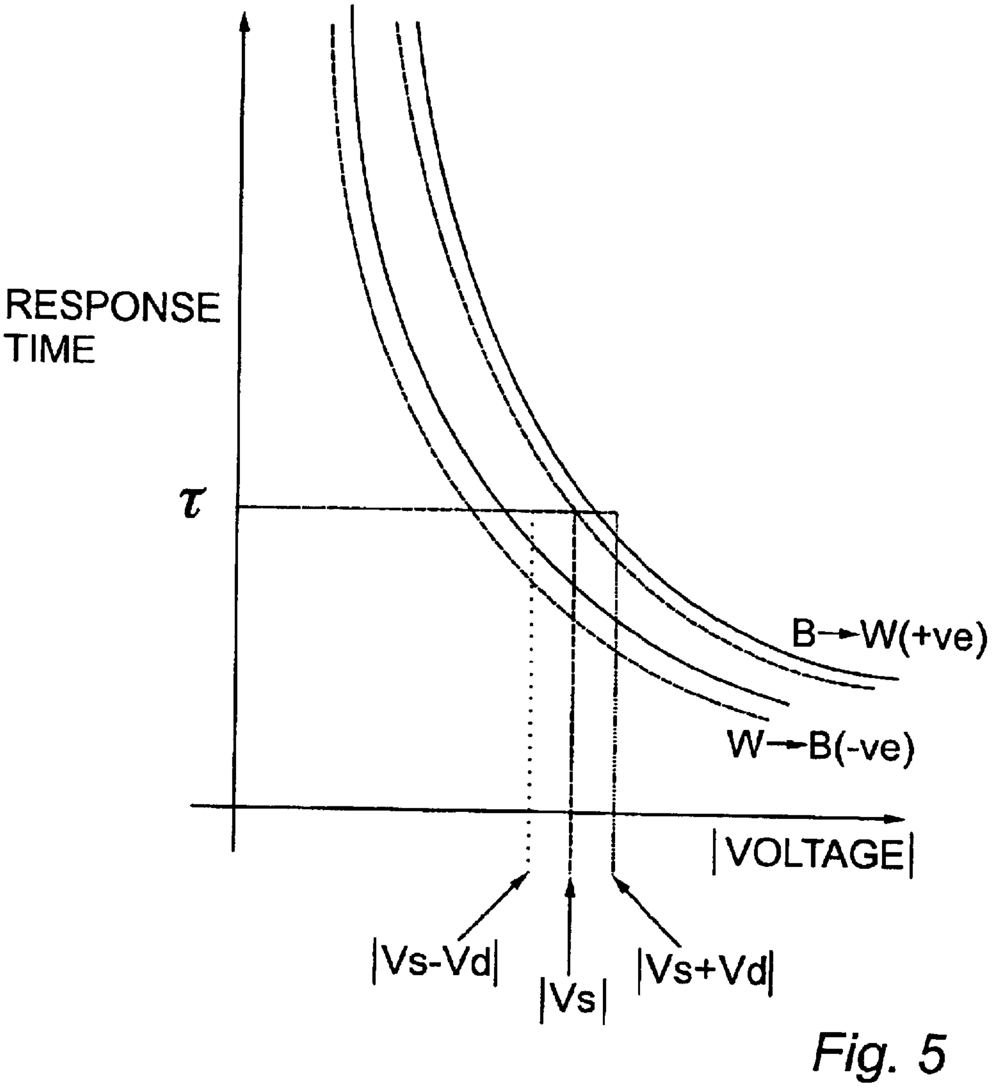
Figure 6:
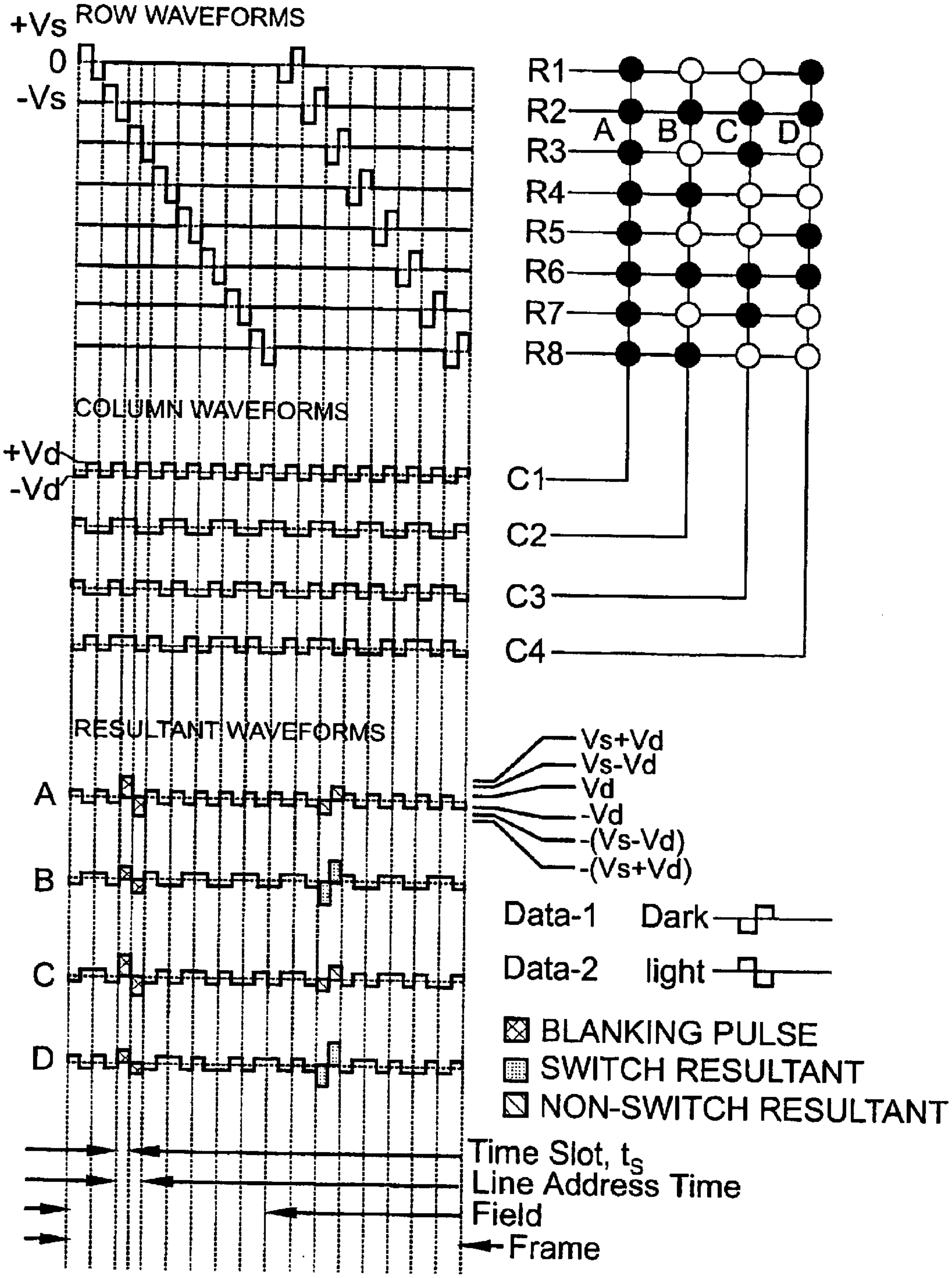
Figure 7:
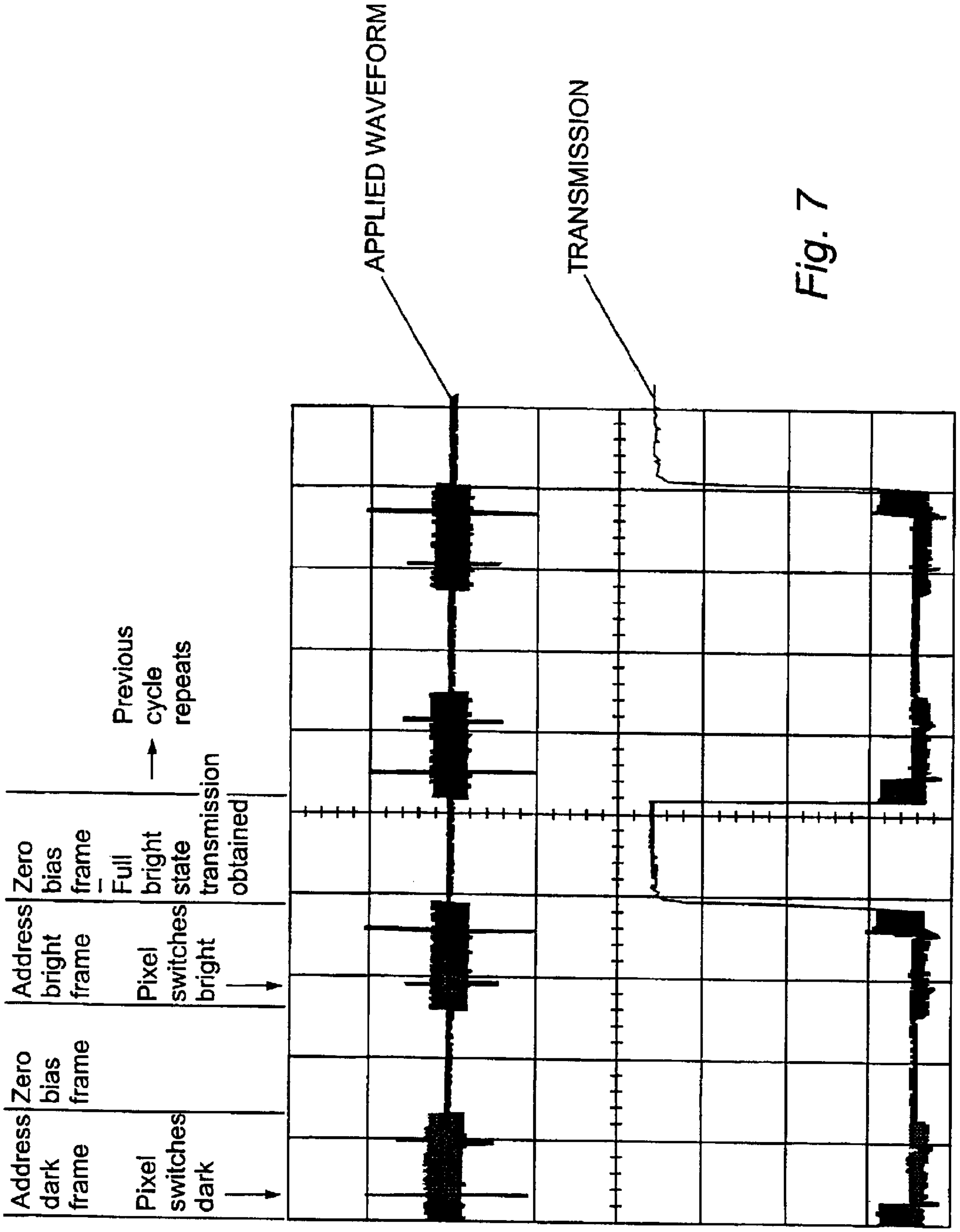
Figure 8:
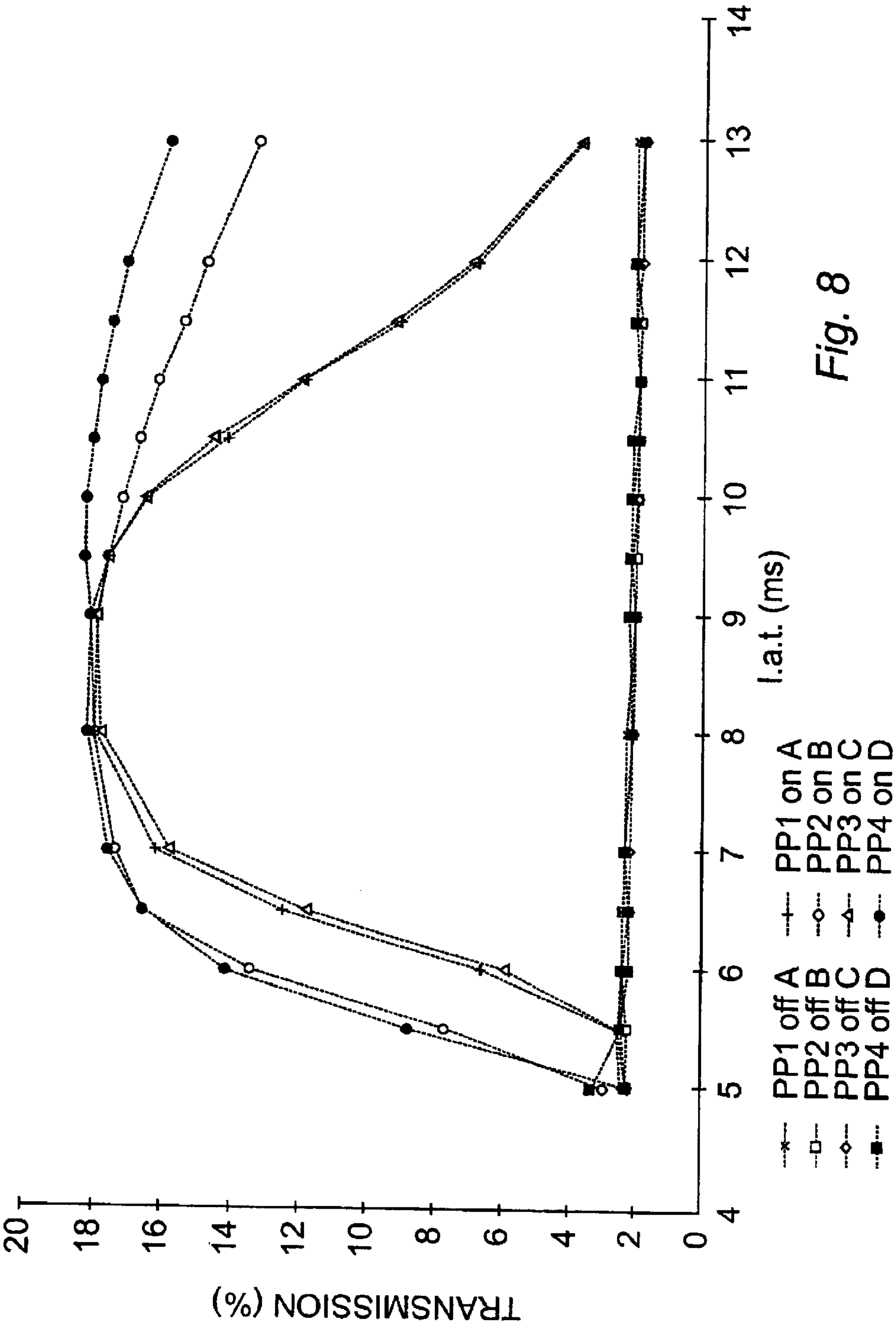
Figure 9:
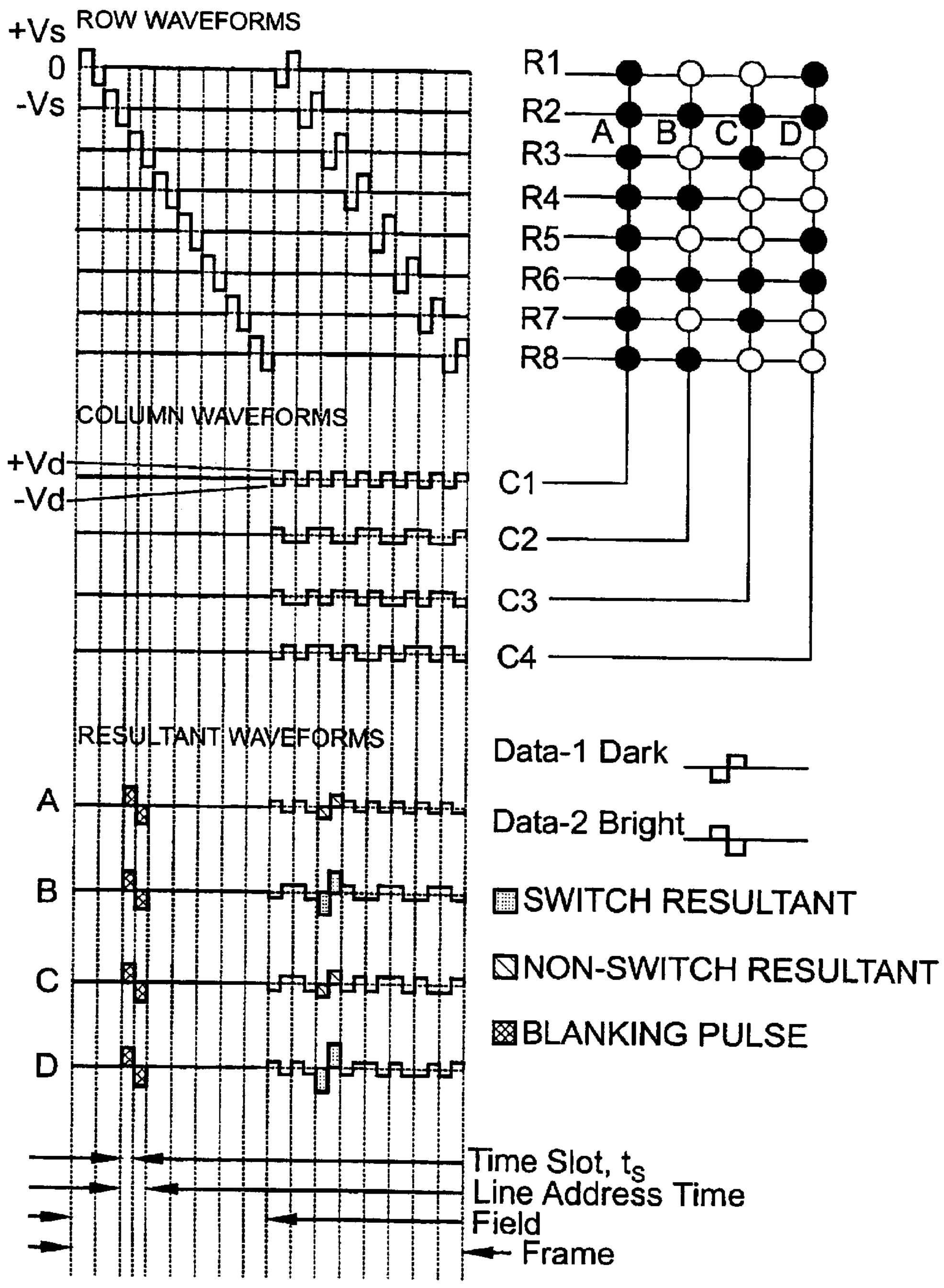
Figure 10:
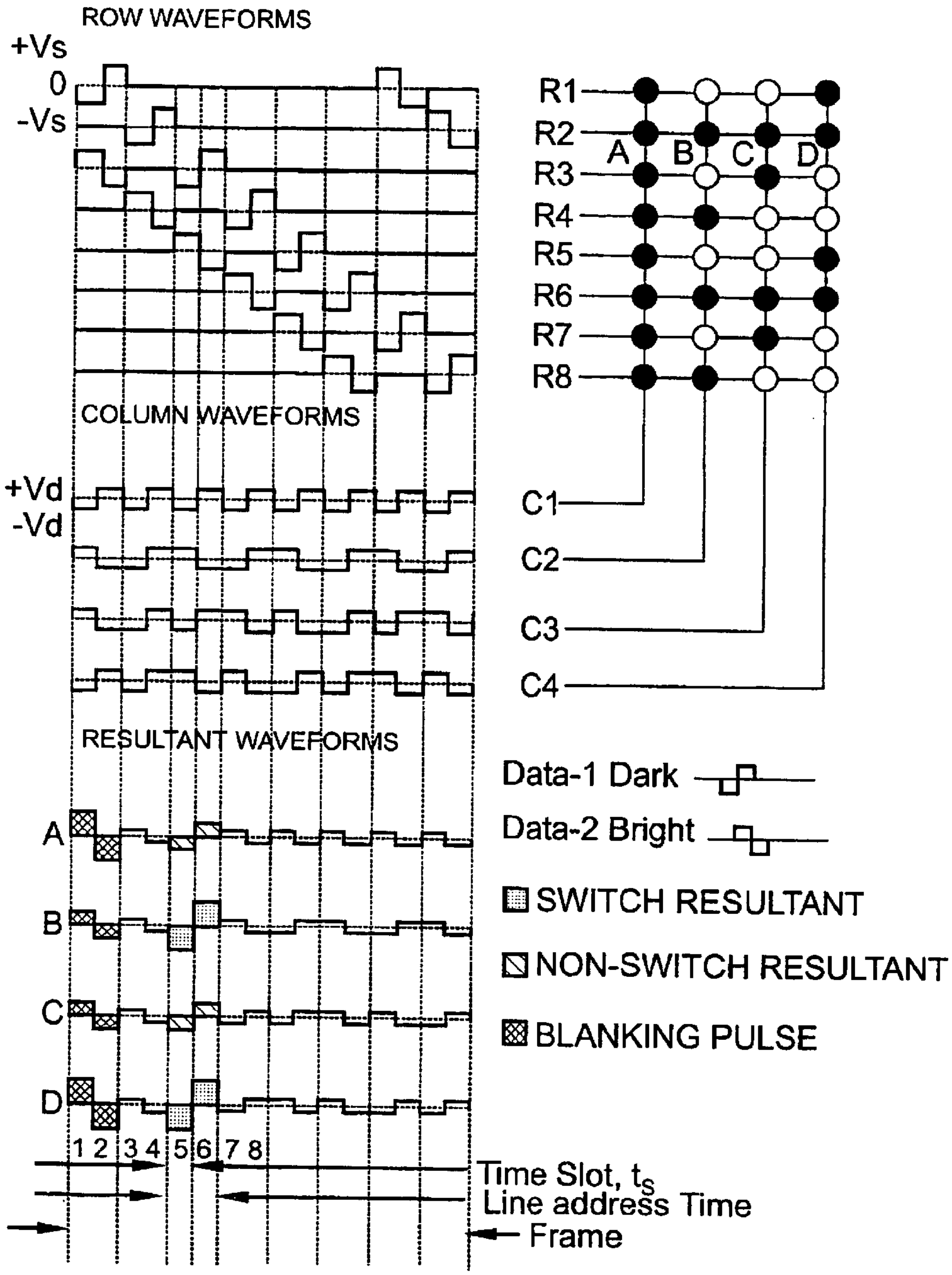
Figure 11:
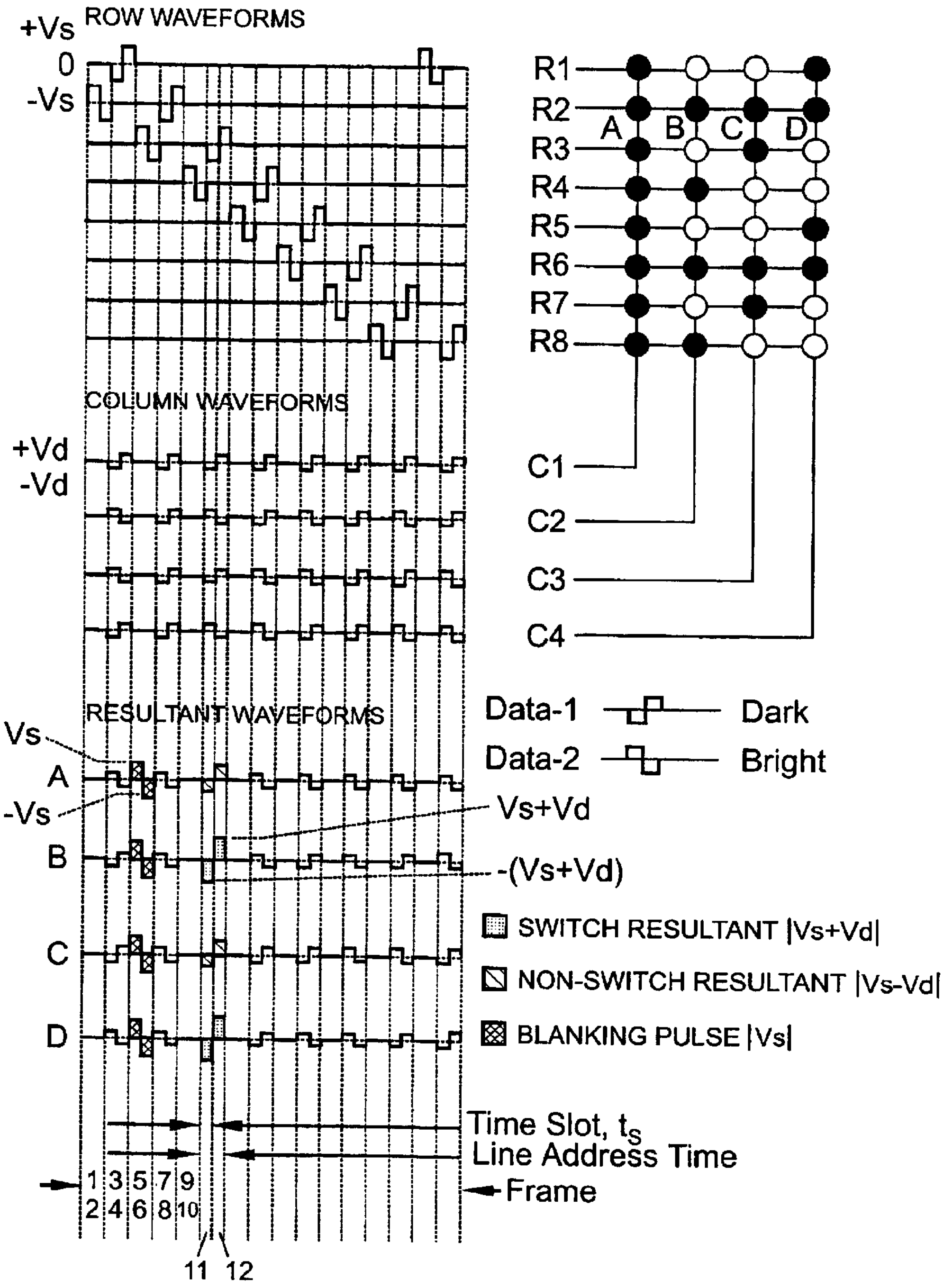
Figure 12:
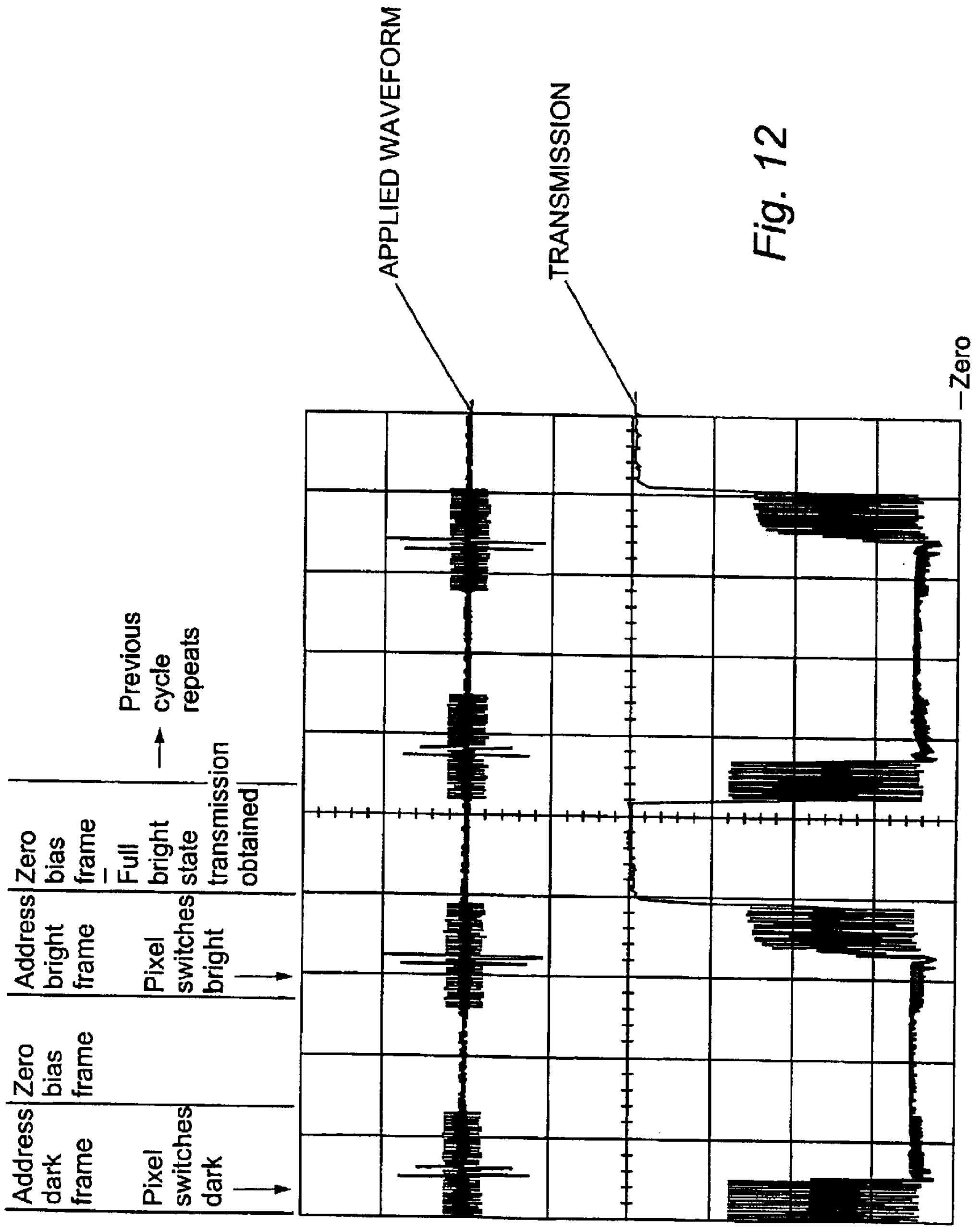
Figure 13:
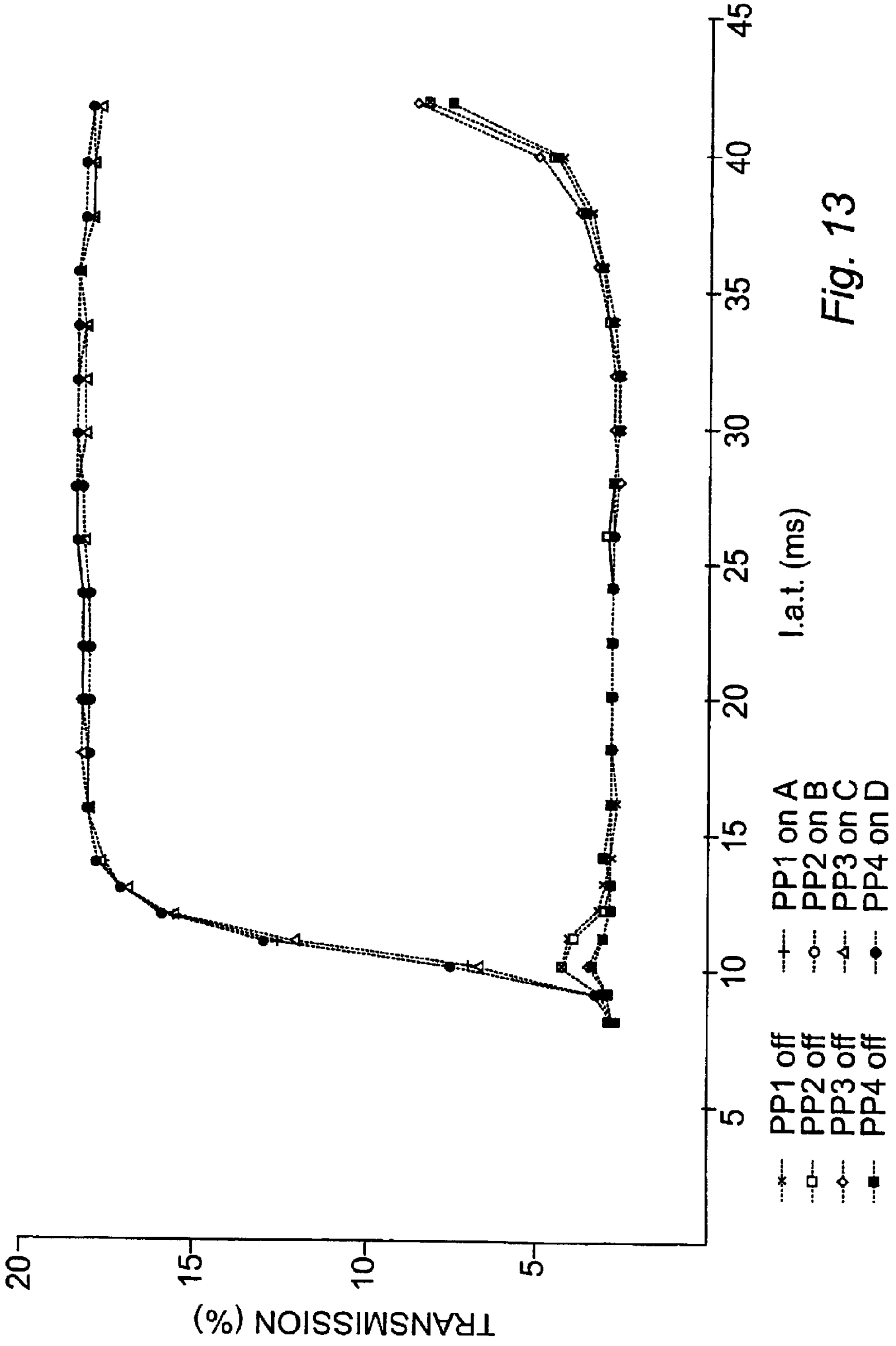
Figure 14:
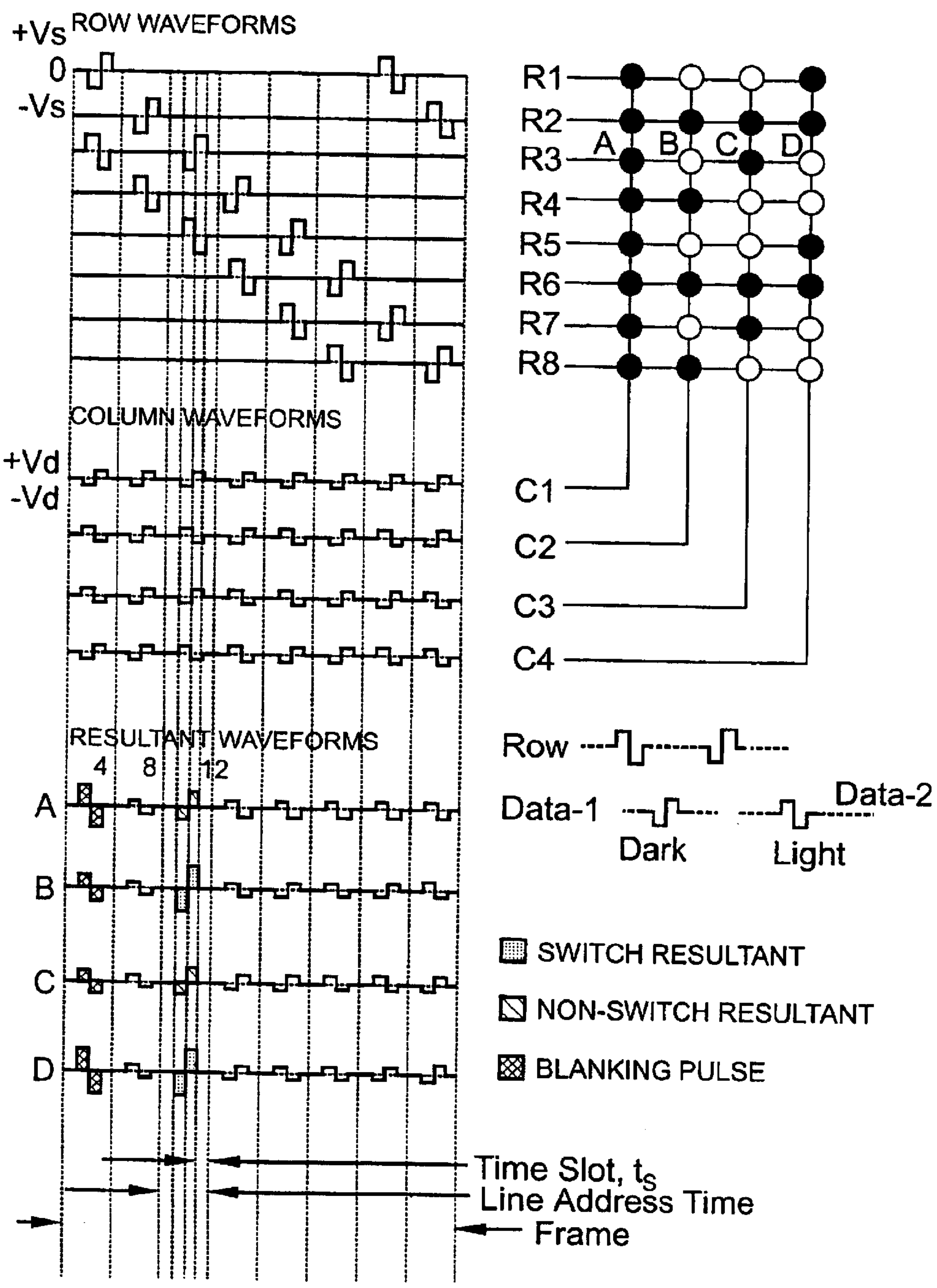
Figure 15:
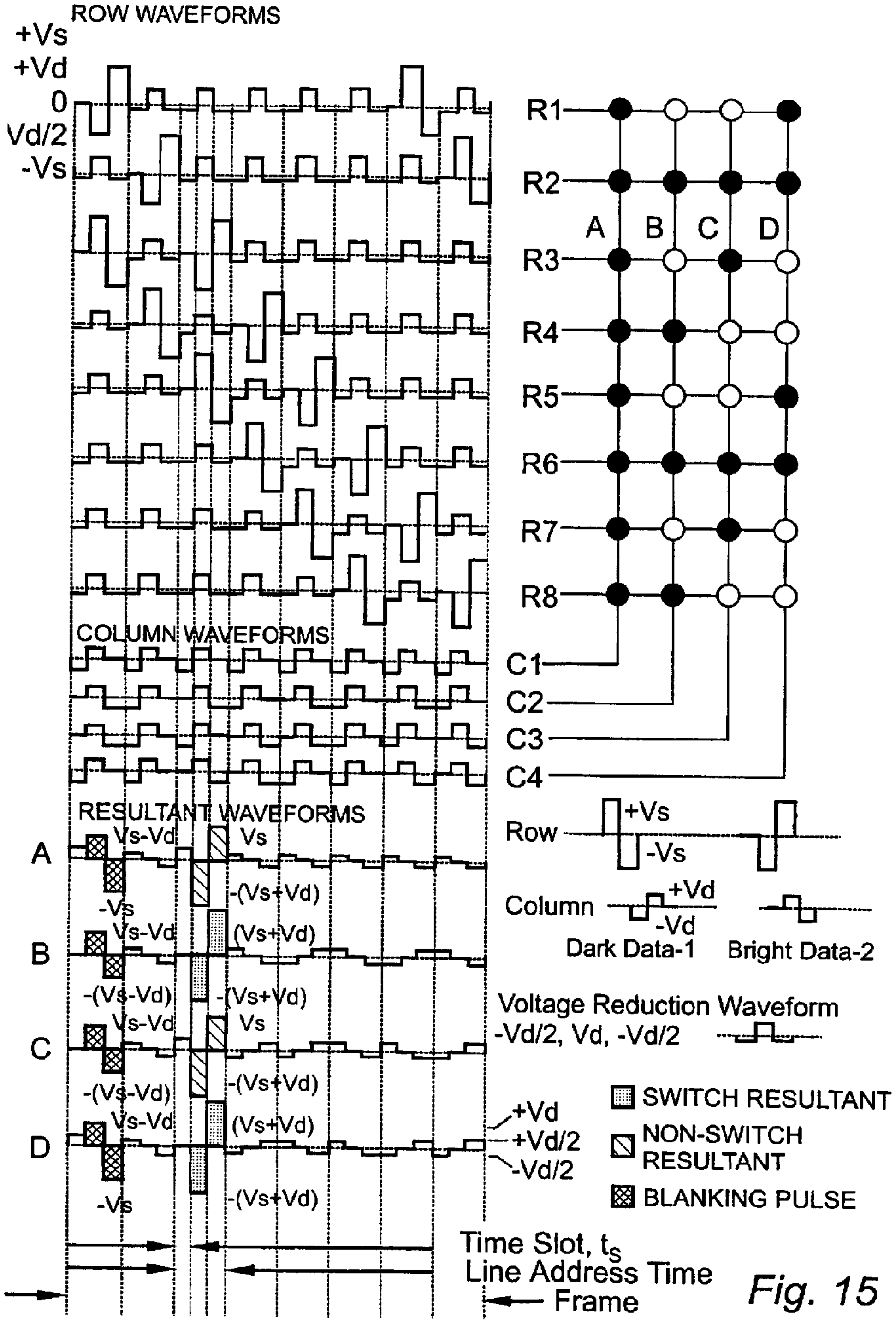

FIGS. 3*a* and 3*b* show a cross section of a stylised cell configuration with bistable switching between the two states as described in WO-97/14990, the two figures show high and low surface tilt respectively on a bistable surface;

FIG. 4 shows the transmission of the cell and the applied signals as a function of time;

FIG. 5 shows switching characteristic of time against voltage for a bistable nematic device, two sets of curves are shown to indicate switching from dark to light (upper curve) and light to dark (lower curve), the solid lines indicate full switching and the broken lines indicate onset of switching;

FIG. 6 shows a first example of waveforms of the present invention to address eight lines with four columns using two time slot addressing with strobe pulses arranged in two equal field addressing times;

FIG. 7 shows the optical response of a pixel to resultant voltages applied by the addressing scheme of FIG. 6;

FIG. 8 shows the effect of changing line addressing time on transmission at several marked pixels to give an indication of pixel pattern dependence on the addressing scheme of FIG. 6;

FIG. 9 shows a scheme similar to that of FIG. 6, but with a zero voltage level applied to all column electrodes in the first field time;

FIG. 10 shows a two slot scheme where each line is blanked to one state then switched selectively to the other state;

FIG. 11 shows a two slot scheme with blanking and selective switching, where the rows are addressed with two interleaved fields, rather than each field in turn as in FIG. 9;

FIG. 12 shows the optical response of a pixel to resultant voltages applied by the addressing scheme of FIG. 11;

FIG. 13 shows the effect of changing line addressing time on transmission at several marked pixels to give an indication of pixel pattern dependence on the addressing scheme of FIG. 11;

FIG. 14 shows a four slot addressing scheme with blanking followed by selective switching and periods of zero voltages in both strobe and data waveforms; and FIG. 15 shows a three slot addressing scheme with blanking then selective addressing and with rms. reduction waveforms applied to rows to reduce resultant rms. voltage value.

Figure 1:
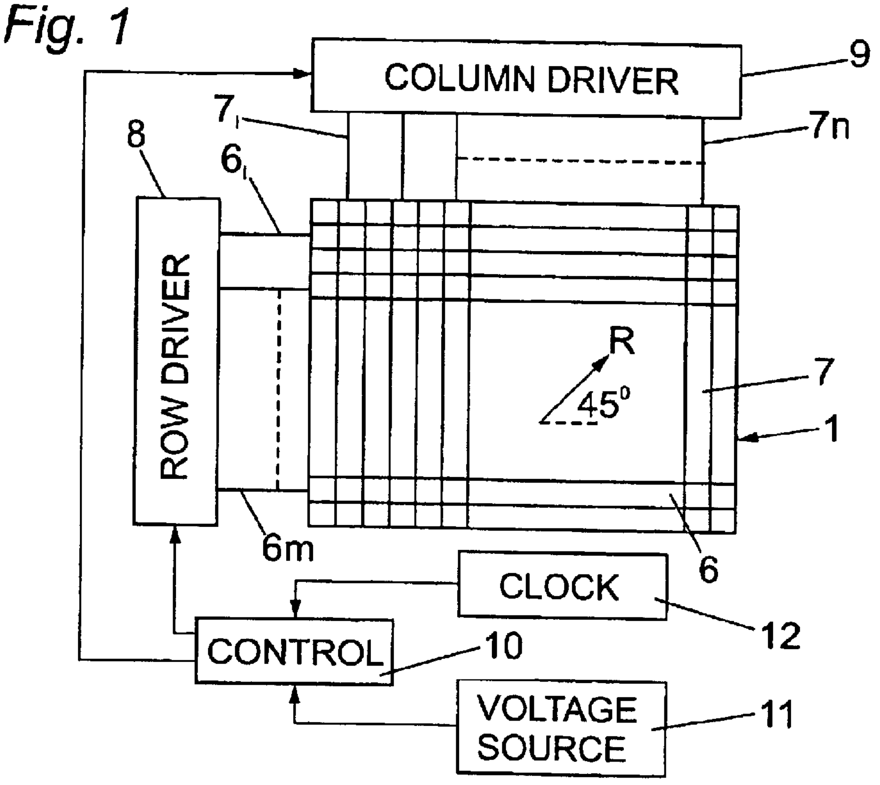
FIG. 1 is a plan view of a matrix multiplexed addressed liquid crystal display as described in WO-GB96/02463.
Figure 2:
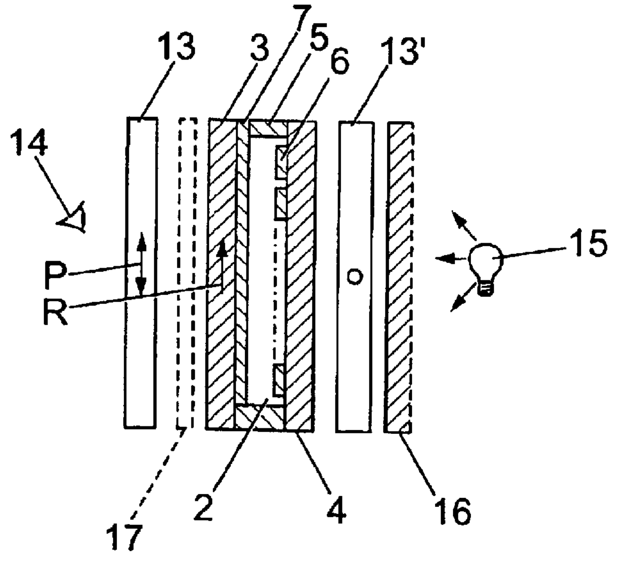
FIG. 2 is the cross section of the display of FIG. 1.

The known display in FIGS. 1, 2 comprises a liquid crystal cell 1 formed by a layer 2 of nematic or long pitch cholesteric liquid crystal material contained between glass walls 3, 4. A spacer ring 5 maintains the walls typically 1–6 μm apart. Additionally numerous beads of the same dimensions may be dispersed within the liquid crystal to maintain an accurate wall spacing. Strip like row electrodes 6 e.g. of $SnO_2$ or ITO (indium tin oxide) are formed on one wall 3 and similar column electrodes 7 are formed on the other wall 4. with m-row and n-column electrodes this forms an m×n matrix of addressable elements or pixels. Each pixel is formed by the intersection of a row and column electrode.

A row driver 8 supplies voltage to each row electrode 6. Similarly a column driver 9 supplies voltages to each column electrode 7. Control of applied voltages is from a control logic 10, which receives power from a voltage source 11 and timing from a clock 12.

Either side of the cell 1 are polarisers 13, 13' arranged with their polarisation axis substantially crossed with respect to one another and at an angle of substantially 45° to the alignment directions R, if any, on the adjacent wall 3, 4 as described later. Additionally an optical compensation layer 17 of e.g. stretched polymer may be added adjacent to the liquid crystal layer 2 between cell wall and polariser.

A partly reflecting mirror 16 may be arranged behind the cell 1 together with a light source 15. These allow the display to be seen in reflection and lit from behind in dull ambient lighting. For a transmission device, the mirror 16 may be omitted. Alternatively, an internal reflecting surface may be used.

Prior to assembly, at least one of the cell walls 3, 4 are treated with alignment gratings to provide a bistable pretilt. The other surface may be treated with either a planar (i.e. zero or a few degrees of pretilt with an alignment direction) or homeotropic monostable surface, or a degenerate planar surface (i.e. a zero or few degrees of pretilt with no alignment direction).

The grating surfaces for these devices can be fabricated using a variety of techniques. as described in WO-97/14990. The homeotropic treatment can be any surfactant, which has good adhesion to the grating surface. This treatment should also lead to an unpinned alignment. That is, an alignment which favours a particular nematic orientation without inducing rigid positional ordering of the nematic on the surface.

Finally the cell is filled with a positive dielectric anisotropy nematic material which may be e.g. E7, ZLI2293 or TX2A (Merck). Alternatively the material may be a negative dielectric anisotropy nematic material such as ZLI 4788, ZLI.4415, or MLC.6608 (Merck).

Small amounts e.g. 1–5% of a dichroic dye may be incorporated into the liquid crystal material. This cell may be used with or without a polariser, to provide colour, to improve contrast, or to operate as a guest host type device; e.g. the material D124 in E63 (Merck). The polariser(s) of the device (with or without a dye) may be rotated to optimise contrast between the two switched states of the device.

One suitable cell configuration to allow switching between the bistable states is shown in FIG. 3 which is a stylised cross section of the device in which a layer 2 of nematic liquid crystal material with positive dielectric anisotropy is contained between a bistable grating surface 25 and a monostable homeotropic surface 26. The latter surface 26 could, for example, be a flat photoresist surface coated with lecithin. Within this device liquid crystal molecules can exist in two stable states. In state (a) both surfaces 25, 26 are homeotropic whereas in (b) the grating surface 25 is in its low pretilt state leading to a splayed structure. Either state may be bright or dark depending on orientation of polarisers, bulk twist angle and cell geometry (transmissive/reflective). The convention adopted in this application is to define the OFF state of FIG. 3*a* as a dark (or black) state; and that of FIG. 3*b* the bright (or light) state. For many nematic materials, a splay or bend deformation will lead to a macroscopic flexoelectric polarisation, which is represented by the vector F in FIG. 3. A dc pulse can couple to this polarisation and depending on its sign will either favour or disfavour configuration (b).

With the device in state (a), the application of a positive pulse will still cause fluctuations in the homeotropic structure despite the positive dielectric anisotropy. These fluctuations are sufficient to drive the system over the energy barrier that separates the two alignment states. At the end of the pulse the system will fall into state (b) because the sign of the field couples favourably with the flexoelectric polarisation. With the system in state (b), a pulse of the negative sign will once again disrupt the system but now it will relax into state (a), as its sign does not favour the formation of the flexoelectric polarisation. In its homeotropic state, the bistable surface is tilted at slightly less than 90° (e.g 89.5°). This is sufficient to control the direction of splay obtained when the cell switches into state (b).

One particular cell consisted of a layer of nematic ZLI2293 (Merck) sandwiched between a bistable grating surface and a homeotropic flat surface. The cell thickness was 3 $\mu$m. Transmission was measured through the cell during the application of dc pulses at room temperature (20° C.). The polariser and analyser 13, 13' on each side of the cell 1 were crossed with respect to each other and oriented at ±45° to the grating grooves. In this set up, the two states in FIGS. 3, (*a*) and(*b*), appear dark. (black) and bright (light) respectively when addressed as follows.

FIG. 4 shows the applied voltage pulses (lower trace) and the optical response (upper trace) as a function of time. Each pulse had a peak height of 55.0 volts and a duration of 3.3 ms. Pulse separation was 300 ms. With the first application of a positive pulse, the transmission changes from dark to light indicating that the cell has switched from state FIG. 4(*a*) to state (b). A second positive pulse causes a transient change in transmission due to the rms. effect of coupling to the positive dielectric anisotropy causing a momentary switching of the bulk material to state (a). However, in this case the cell does not latch at the surface and so remains in state (b), The next pulse is negative in sign and so switches the cell from state (b) to state (a). Finally a second negative pulse leaves the cell in state (a). This experiment shows that the cell does not change state on each pulse unless it is of the correct sign. Thus it proves that the is system is bistable and that the sign of the applied pulse can reliably select the final state.

FIG. 5 shows typical switching characteristics. Four lines are shown, the upper full line and upper broken line indicate the time/voltage curves when switching from dark to light; the broken curve indicates the onset of switching, the full curve indicates complete switching. The region between the full curve and broken curve is a partial switch region. The lower two lines indicate the same features for switching from light to dark. Time/voltage values above the full curve always switch. As shown, for a particular value of time $\tau$ a pulse of negative Vs (or −(Vs−Vd) or −(Vs+Vd)) will switch all pixels to dark; but a pulse of +Vs by itself is not sufficient to fully switch to light. Thus to switch to bright requires +(Vs+Vd), i.e. the strobe pulse plus the appropriate data pulse is required.

The partial switching region may be exploited to partially switch pixels and thereby generate levels of grey scale in an analogue fashion. For example the data waveform amplitudes, Vd, may be modulated in such a way that the resultant strobe plus data pulse falls within the dark to bright partial switching region in a controlled manner. If the strobe and data voltages were such that (Vs−Vd) lay on the onset of switching curve and +(Vs+Vd) lay on the full switching curve then varying the amplitude of the data voltage from zero to Vd would give controlled partially switched levels of brightness for resultant pulses of +(Vs±Vd) whilst resultant pulses of −(Vs±Vd) would always switch to dark.

These curves contrast with e.g. FELCDs where switching characteristic curves vary with the shape of applied voltages, but not with the direction of switching. The distance apart of the two curves can be varied by varying the height of the grating surface, and/or varying the amplitude of the grating, and/or varying surface anchoring energy, e.g by use of different surfactants. This has the effect of changing the energy. level of the two permitted states. By this means, the two curves can be made to occur even further apart, to coincide or even reverse their positions.

One possible explanation for this separation of the two curves is that switching to black utilises both flexo electric dielectric coupling to the applied field (for a positive dielectric anisotropy material), whereas in switching to the white state there is coupling to the flexo electric constant only. The shape of the grating surface is selected to give slightly different energy levels in the two states to allow for this, or even enhance the difference between switching voltages. In one typical example the value of grating height h to period w h/w was 0.6; typically the range is 0.5 to 0.7. Typically h is 0.5 in a range of 0.1 to 10 $\mu$m, w is 1 in a range 0.05 to 5 $\mu$n. In the device of WO-97/14990 h/w was 0.6. For low h/w, the high pretilt state has the lowest energy and so the nematic will preferentially adopt a high pretilt state, FIG. 3*a*. Conversely for large h/w, the low pretilt state has the lowest energy and nematic will preferentially adopt this state. Around h/w=0.52 the two states have the same energy. Arranging h/w away from this condition separates the two switching curves of FIG. 5. Additionally or alternatively, the surface surfactant may be varied.

The characteristics shown in FIG. 5 can be obtained in a test cell (e.g. a single pixel cell) by application of suitable voltage pulses. In a matrix cell with many pixels, e.g. FIG. 1, voltages are applied by application of row waveforms to each row in a sequence at the same time that one of two data waveforms are applied to each column. This requires designing the shape of the row and column waveforms to achieve the desired result. Several different shapes and arrangements are possible and are described below. A common feature is the need to achieve substantially net zero dc voltage at each pixel. This is usually achieved using waveforms with pairs of equal and opposite unipolar pulses, even though for addressing purposes only, single pulses would be adequate.

FIG. 6 shows a first example of the present invention. A four column by eight-row matrix is addressed into the particular pattern shown with full circles the OFF dark, state and the empty circles the ON light state.

All waveforms are time divided into time slots ts. The time taken to address each line is 2 ts and is termed the line address time. The time taken to address a complete display is termed a frame time, made up (in the specific example of FIG. 6) of two field times.

Addressing is by way of row waveforms applied in a sequence to each row in turn, together with one of two data waveforms applied to each column. The row waveform is formed of a first pulse of voltage +Vs in a ts immediately followed by a pulse of −Vs in one ts in a first field followed sometime later by the inverse in a second field. In the context of FIG. 6, the four pulses of amplitude Vs are termed strobe pulses. In the technical field of FELCD's, the term strobe is used for a (row) pulse which combines with a data (column) pulse selectively to effect pixel switching; whilst the term blanking pulse is used for a (row) pulse that always causes a pixel to switch irrespective of the data pulse applied to a column. Often the blanking pulse is significantly larger in amplitude and/or time than strobe pulses. For the eight-row display of FIG. 6, the field time is 8×2 ts and therefore the frame time is 2×8×2 ts.

The two data waveforms are the same but opposite polarity, one (shown as data-1) is used when switching to a dark state, the other (shown as data-2) to switch to a light state when combined with an appropriate strobe. Each data waveform consists of pulses of either +Vd or −Vd in successive time slots.

Marked on the FIG. 6 are pixels, row and column intersections, R3/C1, R3/C2, R3/C3, R3/C4 marked A, B, C, D respectively.

Column waveforms applied to columns C1 to C4 are shown. Since all pixels in C1 remain in the OFF dark state, the data waveform for C1 remains the same data-1 for the whole addressing time. In column C2 the pixels are alternately OFF and ON, and therefore the waveform applied to C2 is alternately data-1 and data-2. For C3 the column waveform is data-2, data-1, data-1, data-2, data-2, data-1, data-1, and data-2 in successive line address times of 2 ts. Column C4 receives data-1, data-1, data-2, data-2, data-1, data-1, data-2, data-2 in successive line address times.

Resultant waveforms appearing at pixels A, B, C, D, are as shown. For pixel A the strobe in the first field time is used with data-1 to cause a switching to dark with the second of the strobe pulses in ts6 giving a resultant of −(Vs+Vd). Examination of FIG. 5 shows that a pixel can be switched from light to dark at a voltage time product between the two curves. The combination of either −(Vs+Vd) or −(Vs−Vd) can be arranged in the first field time to lie between the two curves and cause switching to dark. This means that the data waveform in this first field can be either data-1 or data-2. Data-1 is used in the particular example of pixel A FIG. 6. Therefore, to use the terminology of FELCD's the first two strobe pulses are blanking pulses even though they are of the same amplitude as the true strobe pulses. Later, for pixel A in the second field time, the resultant +(Vs−Vd) is not sufficient to cause switching from OFF to ON because it lies between the two curves of FIG. 5 and therefore below the value required to switch from dark to light.

Pixel B is switched by resultant −(Vs−Vd) to dark (because of a lower amplitude required to switch to dark than to bright) in ts6 of the first field time and to bright in the second field time by the resultant +(Vs+Vd) in the second pulse of the second strobe pulse pair in ts22. Similarly, (like pixel A) pixel C is switched to dark in the first field time and remains dark in the second field time. Pixel D (like pixel B) is switched to dark in the first field time and to light in the second field time.

Separation of the curves allows a strobe pulse to, function as a blanking pulse. One disadvantage for some two-field schemes is that the bright state has a reduced average value because e.g. pixels B and D are always switched to dark in one field and bright in the second field. Bringing the two curves of FIG. 5 together, allows the voltage levels to be adjusted e.g. so that bright pixels can remain bright in the first field with increase average transmission levels.

The example shown in FIG. 6 uses two field times of equal time duration, the first field is used to switch to the OFF dark state, and the second field is used to switch to the ON light state. Throughout both first and second field times, data-1 or data-2 is applied to each column. This has a disadvantage of maintaining a high rms. level of voltage at each pixel. Display contrast is reduced with increasing rms. levels.

FIG. 7 shows the response of a pixel to the resultant waveforms of FIG. 6; the applied waveform is at the top and the optical response shown below. Test details were as follows: Vs=15 v, Vd=4 v, line address time=10 ms, material Merck BL-036, thickness approximately 4 $\mu$m. At time zero the pixel is in the bright state but transmission is small due to the rms. signal caused by the column waveforms at a pixel in its light state. A large dc pulse switches the pixel to its dark state and the transmission drops to a low value within the time shown as address dark frame. If the pixel then receives zero voltage, the transmission is seen to drop even further; this is indicated as a time of zero bias frame.

During the second field time, indicated as address bright frame, an amount of rms. is received due to the column waveforms, then an address to light state pulse is received and causes an increase in transmission indicating that the pixel has switched to its light state. If the pixel then receives zero voltage, indicated as zero bias frame, then the transmission increases considerably to a higher level.

Two features are observed. First the pixel switches and latches into two stable states, the dark and light states. Second the presence of rms. voltage across a pixel reduces the contrast between dark and light states. Thus the best display occurs when all pixels are latched to their required dark or light state, and when all voltages are removed from the device. For some devices where information to be displayed is changed infrequently, such an addressing scheme is adequate. For example credit card type displays which are only changed at sales transactions.

FIG. 8 shows light transmission for each pixel A, B, C, D in FIG. 6 plotted against changes in line address time (l.a.t.). The addressing scheme of FIG. 6 had Vs=15 v, Vd=4 v with 32 lines addressed. When line address time is around 8 or 9 mseconds, all four pixels will switch fully. Either side of this time, some pixels will switch partly, thereby indicating what is termed pixel pattern dependence. Thus for the scheme of FIG. 6, to obtain maximum usefulness, the line address time must be adjusted so that a clear display is obtained whatever pattern of dark and light pixels is required.

FIG. 9 is similar to that of FIG. 6, except that throughout the entire first field time, the column waveform is held at zero volts. As a result the maximum voltage at pixels A, B, C, D during the first field time are +Vs and −Vs. This level is arranged to be sufficient to switch all to the dark OFF state when −Vs is received. In the second field time, all pixels required to be ON are switched to ON by the pulse +Vs+Vd. For pixel B and D this has the disadvantage that pixels B, and D are switched to OFF for one field time then to ON in the second field time; this reduces their average brightness.

In a modification (not shown) of FIG. 9, the two strobe pulses in the first field are applied to each row at the same time, thereby reducing the first field to as low as 2 ts, but can be made longer. At the same time either a zero or a data-1 or modified data is applied to all columns. Then, in a second field as for FIG. 9, the remaining strobe pulses and either data-1 or data-2 are applied to respective rows and columns to cause selective switching. Such an addressing scheme can be termed blanking followed by selective switching in one field; it reduces the frame time.

A variation of total blanking in one line address time then selective switching, is to blank then selectively address each row in turn. This is shown in FIG. 10 where each row is blanked 2 line address times ahead of selective addressing. In the particular example of FIG. 10 the blanking pulses are of the same amplitude as the strobe. For example, at row R3, the blanking (after receiving +Vs for ts1) is −Vs in ts2, which switches all pixels to dark irrespective of which data waveform is being applied. This is shown in the resultant waveforms where all pixels in row R3 switch in the first two time slots.

In the particular example of FIG. 10 the blanking is 2 line addressing times ahead of the strobe; other values can be chosen. For example, the blanking may immediately precede the two strobe pulses, or may be several line addressing times ahead.

Thus in R3, after the second blanking pulse of −Vs has been applied, there is zero for both ts3 and ts4. The strobe of −Vs for ts5, and +Vs for ts6 is applied in combination with the appropriate data as shown under column waveforms during periods ts5, ts6. As before the strobe waveform, comprising the two blanking pulses and the two strobe pulses, is applied to each row R1 to R8 in turn. The total address time is 8 line address times, i.e. 16 ts in contrast with 32 ts for the schemes of FIGS. 6, 7.

Examination of the resultants show:

For pixel A, large blanking +(Vs+Vd) then −(Vs+Vd), then +Vd, −Vd (the time between blanking and strobe addressing), then −(Vs−Vd) and +(Vs−Vd) in ts5, ts6. These values Vs−Vd are insufficient to cause switching from the blanked dark to light because Vs−Vd lies between the two curves in FIG. 5 and the material will not switch to light.

For pixel B, blanking by +(Vs−Vd) then −(Vs−Vd). This will switch to dark because the Vs−Vd lies between the curves of FIG. 5 (i.e. above the curve switching to dark) and the material will switch to dark. Later in ts5, ts6, the resultant of −(Vs+Vd) then +(Vs+Vd) switches to light because Vs+Vd is above the dark to light switching curve of FIG. 5.

In the time periods ts5, ts6 the difference between pixels A and B is that the data waveform for pixel A is different to that of pixel B. This allows the selective switching of pixels from dark to light depending upon the data waveform used in combination with the strobe pulses.

For pixels C and D the situation is similar to that for pixels A and B, namely switching to dark by the blanking in ts1, ts2 and selective switching to light in ts5, ts6.

In the scheme of FIG. 10 the whole device is addressed in a single field, the field and frame time are the same. In another embodiment, each row is blanked then selectively addressed at least twice per frame time; i.e. each row is addressed two or more times in two or more fields per frame. A similar scheme is described for FELCDs in WO-95/27971.

FIG. 11 shows a two slot addressing scheme in which first and second fields are interleaved and each pixel is blanked to black then selectively switched to light. The row waveform is a blanking formed by +Vs then −Vs in adjacent time slots, followed by zero volts for 4 ts, then addressing strobes of −Vs and +Vs in adjacent times slots. In this example the blanking pulse and addressing strobe pulse are of equal value, but they could be different.

Data waveforms are −Vd then +Vd for dark switching, and +Vd then −Vd for light switching. When a particular row is blanked the data value is zero on all columns since there is no need for selectivity of data and the pixel will switch dark under −Vs only.

Addressing of R3 is as follows: for time periods ts5, ts6 the strobe waveform is +Vs then −Vs, the row waveforms are zero on all columns C1 to C4, giving resultants of +Vs then −Vs at each pixel A, B, C, D which gives a blanking level switching to dark in ts6. For time slots ts7 and ts8 the resultant at pixels A, B, C, D is +Vd then −Vd, which is below any switching level. For time slots ts9 and ts10 the resultants at pixels A, B. C, D are zero because the row 3 waveform is zero and all the columns are at zero while row 4 is being blanked. For time slots ts11 and ts12 the addressing strobe is −Vs then +Vs, the data waveform is −Vd then +Vd on C1 and C3, and +Vd then −Vd on C2 and C4. The resultant at pixels A and C is −(Vs−Vd) then +(Vs−Vd) which is insufficient to cause switching from dark to the bright state. The resultant at pixels B and D is −(Vs+Vd) then +(Vs+Vd) which is sufficient in ts12 to cause a switching to bright.

The effect of interleaving is as follows: immediately after R3 is blanked, i.e. ts7 and ts8, row R2 is selectively addressed to the light state by the strobe pulse of −Vs then +Vs whilst data levels of +/−Vd are applied to each C1 to C4. This is followed in time, i.e. ts9 and ts10, by blanking pulses of +Vs then −Vs applied to R4 whilst zero data voltage is applied to columns C1 to C4. Thus addressing is as follows: (e.g. starting at row R3) blank R3, selectively address R2, blank R4, selectively address R3, blank R5, selectively address R4, blank R6, selectively address R5, blank R7, selectively address R6 etc. The effect of interleaving is to reduce the time between the dark and the light state for pixels required to be in the light state, and also to reduce the rms. level at each pixel due to the zero voltage during some time periods.

FIG. 12 shows a pixel's optical response, lower trace, to applied voltages, upper trace, for the addressing scheme of FIG. 11; Vs=15 v, Vd=4 v, l.a.t.=20 ms, 32 lines of addressing. At time zero the pixel is in its light state and receiving a small rms. voltage from the data waveforms. Within the time marked address dark frame the pixel receives a blanking −Vs pulse which causes switching to the dark state and a large reduction in optical transmission. During the time marked address bright frame a large switching pulse of Vs+Vd causes a switching to the light state and a large increase in optical transmission which increases further during the time marked zero bias. Comparison of FIG. 12 with that of FIG. 7 shows a much improved contrast between dark and light state particularly during the time when an rms. voltage appears at a pixel. Therefore the addressing scheme of FIG. 11 is better than that of FIG. 6 for displays requiring continual updating of information.

Additionally, as shown in FIG. 13, the range of line address times over which the pixels A, B, C, D switch is much superior to that in FIG. 8. Clear switching is obtained from about 12 ms to about 35 ms. This shows the scheme of FIG. 11 is relatively insensitive to pixel pattern irregularity.

The addressing schemes of FIGS. 6–11 are two slot schemes, i.e. both strobe and data waveforms are two pulses period.

FIG. 14 shows a four slot scheme with blanking. In this the row waveform is zero, +Vs, −Vs, zero to give blanking, and zero, −Vs, +Vs, zero to give strobe pulse. The column waveform is zero, −Vd, +Vd, zero to give selective switching to dark, and zero, +Vd, −Vd, zero to give selective switching to light. As shown blanking and strobe pulses are of the same amplitude but could be different. The gap between the end of the blanking and the start of a strobe is 4 ts time periods but could be longer or shorter.

For pixel A the resultant is zero, +(Vs+Vd), −(Vs+Vd), zero in periods ts1 to ts4 giving blanking to dark in ts3. In periods ts9 to ts12 the voltages are zero, −(Vs−Vd), +(Vs−Vd), zero which does not switch to bright and the pixel A remains dark as required.

For pixel B the resultant is zero, +(Vs−Vd), −(Vs−Vd), zero in ts1 to ts4 which is sufficient to blank to dark in period ts3. In periods ts9 to ts12 the voltage is zero, −(Vs+Vd), +(Vs+Vd), zero which switches to light in ts11 as required.

Similarly for pixels C, D, both are blanked to dark in ts3 and pixel D is selectively switched to light in ts11.

Inspection of the resultant waveforms shows a short time between switching from dark to light where required, and zero voltage for some periods thereby reducing the rms. level.

Both two and four slot addressing schemes have been described above. It is also possible to have an odd number of slots. This is shown in FIG. 15, which is a blanked three slot scheme with a voltage reduction waveform applied to rows only. The row waveform is zero, +Vs, −Vs in three successive ts periods to give a blanking voltage, then zero, −Vs, +Vs in three successive ts periods to give selective addressing to light when combined with an appropriate data waveform. Between the end of the three blanking pulses and the start of the three selective addressing pulses is a period of 3 ts, but this could be more or less. Again the blanking and strobe amplitude levels are the same but could be different. In between the strobe pulses is a voltage reduction waveform. This applies −Vd/2, +Vd, and −Vd/2 in each three time slot period.

The data waveforms are −Vd, +Vd, zero in three adjacent time slots to give switching to dark state; zero, +Vd, −Vd in three adjacent time slots to give switching to light.

In row R3 all pixels A to D are blanked to dark within the period ts1 to ts3, then pixels B and D are selectively switched to light within the period ts7 to ts9. During the period ts4 to ts6 the previously blanked R2 is selectively switched to light For pixel A the resultant voltages are −(1−Vd), +(Vs−Vd), −(Vs−0) in ts1, ts2, ts3 giving a blanking to dark in ts3. In periods ts7, ts8, ts9 the resultant voltages are −(0−Vd), −(Vs+Vd), (Vs−0) without switching from dark.

For pixel B the resultant voltages are 0−0, +(Vs−Vd), −(Vs−Vd) in ts1, ts2, ts3 giving a blanking to dark in ts3. In periods ts7, ts8, ts9 the resultants are −(0−0). −(Vs+Vd), +(Vs+Vd) giving selective switching to light in period ts9.

Similarly for pixels C and D, they both blank to dark in ts3, and pixel D selectively switches to light in ts9.

Outside of the blanking and selective switching periods, the resultant waveform is reduced due to the presence of the voltage reduction waveform on the rows (−Vd/2, Vd, −Vd/2) combining with data waveforms values (0, Vd, −Vd) giving resultants of −Vd/2, 0, Vd/2 or Vd/2, 0, −Vd/2. The complete resultant waveform has a reduced r.m.s. level.

Examples of the effect of using voltage reduction waveforms follows:

Appendix A.

Calculation of r.m.s. values of waveforms with and without row reduction waveform of FIG. 14.

Let the display have N rows.

The blanking pulse resultant may be one of two values—

Vd, Vs−Vd, −Vs or 0, (Vs−Vd), −(Vs−Vd)

These give mean square values over the N-way addressing cycle of—

$$B_1=((Vd^2/3+(Vs-Vd)^2/3+Vs^2/3)/N \text{ or } B_2=(2(Vs-Vd)^2/3)/N$$

Similarly the ON and OFF strobe resultants are—

0, −(Vs+Vd), (Vs+Vd) and $Vd_1$−(Vs+Vd), Vs giving mean square values over the N-way addressing cycle of—

$$S_{ON}=(2(Vs+Vd)^2/3)/N \text{ or } S_{OFF}=(Vd^2/3+(Vs+Vd)^2/3+Vs^2/3)/N$$

The data waveform resultants are—

−Vd, Vd, 0 and 0, Vd, −Vd giving mean square values over the N-way addressing cycle of—

$$D=(2\ Vd^2/3)(N-2)/N \text{ for both cases.}$$

For example, if N=128, Vs=20 and Vd=4 then $$B_1=1.75,\ B_2=1.333,\ S_{ON}=3,\ S_{OFF}=2.583\ D=10.5$$

The possible r.m.s. values over the N-way addressing cycle are—

$$ON_{rms}=(B_1+S_{ON}+D)^{1/2}=3.905 \text{ or } ON_{rms}=(B_2+S_{ON}+D)^{1/2}=3.851$$

$$OFF_{rms}=(B_1+S_{OFF}+D)^{1/2}=3.851 \text{ or } ON_{rms}=(B_2+S_{OFF}+D)^{1/2}=3.796$$

If the r.m.s. reduction waveform is now included the data waveform resultants become—

−Vd/2, Vd/2, 0 and 0, Vd/2, −Vd/2 giving mean square values of—

$$D_R=(2(Vd^2/4)/3)(N-2)/N \text{ for both cases,}$$

which, using the example figures above is $D_R$=2.625.

Since there is no change in the blanking and strobe resultants the possible r.m.s. values over the n-way addressing cycle become—

$$ON_{rms}=(B_1+S_{ON}+D_R)^{1/2}=2.715 \text{ or } ON_{rms}=(B_2+S_{ON}+D_R)^{1/2}=2.637$$

$$OFF_{rms}=(B_1+S_{OFF}+D_R)^{1/2}=2.637 \text{ or } ON_{rms}=(B_2+S_{OFF}+D_R)^{1/2}=2.557$$

i.e. there is a reduction in the r.m.s. voltage of ~1.2 v in a voltage of ~3.8, a reduction of ~31%.

What is claimed is:

1. A method of addressing a bistable nematic device formed by two cell walls enclosing a layer of nematic or long pitch cholesteric liquid crystal material with electrode structures carried by the walls to form a series of row electrodes on one wall and a series of column electrodes on the other wall to form a matrix of intersecting regions or pixels with a wall surface treatment on at least one wall providing a molecular alignment permitting the molecules at or adjacent the wall to align into two different stable states upon application of appropriate unipolar voltage pulses, the method comprising the steps of:

applying a row waveform to each row in a sequence whilst simultaneously applying one of two data waveforms to each column electrode whereby each pixel can be independently switched between two bistable states;

the row waveform having a period of at least two time slots and at least two unipolar pulses for switching the device to a first state, at least two unipolar pulses for switching the device to a second state;

both data waveforms having a period of at least two time slots with a unipolar pulse in each time slot, with at least one data waveform shaped to combine with the row waveform to cause a switching to one latched state;

whereby each pixel can be addressed to latch into one of said two stable states to collectively provide a desired display, with a substantially net zero dc voltage applied to the device.

2. The method of claim 1 wherein the addressing of the device is in two field times, one for switching to one stable state, and the other for switching into the second stable state.

3. The method of claim 2 wherein the field times are of the same length.

4. The method of claim 2 wherein the field times arc different in length.

5. The method of claim 1 wherein the device is addressed by selectively switching pixels to one state in one field time and selectively switching pixels to the other state in the second field time.

6. The method of claim 1 wherein the two unipolar, pulses switching the device to a first state are blanking pulses and the unipolar pulses for switching the device to a second state are switching pulses, and wherein some or all of the pixels are blanked into one state, then selectively switched to the other state.

7. The method of claim 6 wherein the blanking pulses are of equal and opposite amplitude and the switching pulses are of equal and opposite amplitude.

8. The method of claim 6 wherein the blanking pulses are of unequal, including one zero amplitude value, but opposite amplitude and the switching pulses are of unequal, including one zero amplitude value, and opposite amplitude arrange so that overall the device receives substantially net zero dc voltage when addressed.

9. The method of claim 6 wherein the blanking pulses are of the same or different amplitude to those of the switching pulses.

10. The method of claim 6 wherein the blanking and the switching pulses are equally or unequally spaced apart in time.

11. The method of claim 1 wherein the row waveform has at least one unipolar pulse of an amplitude capable of blanking pixels, and at least one unipolar addressing pulse of an amplitude capable of combining with data waveforms to selectively switch pixels.

12. The method of claim 1 wherein the row waveform has at least two unipolar blanking pulses for blanking pixels to one state and at least two unipolar switching pulses for selectively switching pixels to a second state, and each row is addressed in a sequence by the blanking pulses then by the switching pulses in combination with one of the two data waveforms.

13. The method of claim 12 wherein the blanking pulses and the switching pulses are separated by a period of at least one line address time.

14. The method of claim 12 wherein during the application of blanking pulses to one row, the columns receive no voltage pulses, the non addressed rows receive no voltage pulses, and pixels not being blanked receive zero voltage.

15. The method of claim 12 wherein the blanking pulses and the switching pulses are separated by a period of at least one line address time during which time the row waveform is of zero amplitude.

16. The method of claim 1 wherein the row and data waveforms have the same periods of two, three, four, or more time slots ts.

17. The method of claim 1 wherein both the row waveform and the data waveforms are formed of three or more time periods and at least one time slot in the row waveforms and/or the data waveforms are of zero voltage amplitude.

18. The method of claim 1 wherein the addressing is by application of the row waveform to each row in turn.

19. The method of claim 1 wherein the addressing is by application of the row waveform to each row in an interleaved manner.

20. The method of claim 1 wherein additional voltage reduction waveforms are applied to either or both the row waveform and the two data waveforms.

21. The method of claim 1 and comprising the further step of arranging the surface treatment so that switching to one of the bistable states occurs at a lower voltage than switching to the other bistable state.

22. The method of claim 1 further including the steps of measuring the temperature of the liquid crystal material and adjusting the voltage pulses to compensate for changes in switching characteristics with temperature.

23. The method of claim 1 wherein additional waveforms are applied to at least one of the row and column electrodes to reduce rms voltage levels at the pixels and improve display contrast.

24. A bistable nematic device comprising;

two cell walls spaced apart and enclosing a layer of nematic or long pitch cholesteric liquid crystal material;

a first series of electrodes on one wall and a second series of electrodes on the other wall collectively forming a matrix of intersecting regions or pixels;

surface treatments on at least one wall to provide a molecular alignment permitting the molecules at or adjacent the wall to align into two different stable states upon application of appropriate unipolar voltage pulses;

means for distinguishing between the switched states of the liquid crystal material;

means for generating and applying a row waveform to each electrode in the first series of electrodes in a sequence;

means for generating and applying one of two data waveforms to each electrode in the second series of electrodes;

the row waveform having a period of at least two time slots and at least two unipolar pulses for switching the device to a first state, at least two unipolar pulses for switching the device to a second state;

both data waveforms having a period of at least two time slots with a unipolar pulse in each time slot, with at least one data waveform shaped to combine with the row waveform to cause a switching to the first state and the other data waveform shaped to combine with the row waveform to cause a switching to the second state;

whereby each pixel can be independently switched into either stable state to collectively provide a desired display, with a substantially net zero dc voltage applied to the device.

25. The device of claim 24 wherein the energy levels of liquid crystal molecules at the wall surface alignment treatment in the two stable states are adjusted to be similar so that switching characteristics are the same when switching between the two states.

26. The device of claim 24 wherein the energy levels of liquid crystal molecules at the wall surface alignment treatment in the two stable states are adjusted to be different so that switching characteristics are different when switching between the two states.

27. The device of claim 24 wherein the height to width ratio of a grating wall surface treatment is arranged to give different switching characteristics when the device is switched into the two bistable states.

28. The device of claim 24 and further including means for generating and applying to each electrode in either or both the first and second series of electrodes a voltage reduction waveform.

* * * * *